(12) United States Patent
Guérin et al.

(10) Patent No.: US 12,081,883 B2
(45) Date of Patent: Sep. 3, 2024

(54) COLOR FRINGING PROCESSING INDEPENDENT OF TONE MAPPING

(71) Applicant: GoPro, Inc., San Mateo, CA (US)

(72) Inventors: Guillaume Matthieu Guérin, Chatillon (FR); Julien Caron, Guyancourt (FR)

(73) Assignee: GoPro, Inc., San Mateo, CA (US)

( * ) Notice: Subject to any disclaimer, the term of this patent is extended or adjusted under 35 U.S.C. 154(b) by 225 days.

(21) Appl. No.: 17/299,767

(22) PCT Filed: Oct. 17, 2019

(86) PCT No.: PCT/US2019/056741
§ 371 (c)(1),
(2) Date: Jun. 3, 2021

(87) PCT Pub. No.: WO2020/117378
PCT Pub. Date: Jun. 11, 2020

(65) Prior Publication Data
US 2022/0021852 A1    Jan. 20, 2022

Related U.S. Application Data

(60) Provisional application No. 62/775,484, filed on Dec. 5, 2018.

(51) Int. Cl.
*H04N 25/611* (2023.01)
*G06T 5/77* (2024.01)
*G06T 5/80* (2024.01)

(52) U.S. Cl.
CPC ............ *H04N 25/611* (2023.01); *G06T 5/77* (2024.01); *G06T 5/80* (2024.01)

(58) Field of Classification Search
CPC .... H04N 25/611; H04N 23/62; H04N 23/698; H04N 1/3876; H04N 1/58; H04N 1/62; H04N 23/45; H04N 23/51; H04N 1/6027; G06T 5/005; G06T 5/006; G06T 2207/10024; G06T 5/77; G06T 5/80
See application file for complete search history.

(56) References Cited

U.S. PATENT DOCUMENTS

| 9,047,679 | B2 * | 6/2015 | Kim ........................ G06T 5/30 |
| 10,021,295 | B1 | 7/2018 | Baldwin |
| 2006/0098253 | A1 * | 5/2006 | Masuno .................... G06T 5/20 |
| | | | 358/518 |

(Continued)

OTHER PUBLICATIONS

Lee, D-K., B-K. Kim, and R-H. Park. "Colourisation in Yxy colour space for purple fringing correction." IET image processing 6.7 (2012): 891-900. Hereinafter Lee (Year: 2012).*

(Continued)

*Primary Examiner* — Shahbaz Nazrul
(74) *Attorney, Agent, or Firm* — Young Basile Hanlon & MacFarlane, P.C.

(57) ABSTRACT

Systems and methods are disclosed for image signal processing. For example, methods may include receiving an image from an image sensor, detecting, in a linear domain, color fringing areas in the image, correcting detected color fringing areas to obtain a corrected image, performing tone mapping to the corrected image to obtain a tone mapped image and storing, displaying, or transmitting an output image based on at least the tone mapped image.

20 Claims, 9 Drawing Sheets

(56) References Cited

U.S. PATENT DOCUMENTS

| | | | | |
|---|---|---|---|---|
| 2011/0158514 A1* | 6/2011 | Chuang | ............... | H04N 1/58 |
| | | | | 382/163 |
| 2011/0158515 A1* | 6/2011 | Chuang | ............... | H04N 1/58 |
| | | | | 382/163 |
| 2013/0050545 A1* | 2/2013 | Komatsu | ............ | H04N 9/646 |
| | | | | 382/167 |
| 2014/0119650 A1* | 5/2014 | Zhou | ............... | H04N 1/6027 |
| | | | | 382/167 |
| 2015/0117792 A1* | 4/2015 | Itagaki | ............... | G06T 5/00 |
| | | | | 382/254 |
| 2017/0358063 A1* | 12/2017 | Chen | ............... | G06T 5/009 |
| 2018/0048871 A1* | 2/2018 | Johnson | ............ | H04N 25/611 |
| 2018/0096467 A1* | 4/2018 | Chesnokov | ............ | G06T 5/50 |
| 2018/0150946 A1* | 5/2018 | Roffet | ............... | G06T 5/009 |

OTHER PUBLICATIONS

International Search Report Issued in Application No. PCT/US2019/056741, date of mailing Jan. 30, 2020, 12 pages.

Anonymous: "HDR workflow with hugin-PanoTools.org Wiki", Nov. 28, 2012, pp. 1-5, XP055138002, Retrieved from the Internet: URL: https://web.archive.org/web/20121128120652/http://hugin.sourceforge.net/docs/manual/HDR_workflow_with_hugin.html retrieved on Sep. 3, 2014.

G. Eilertsen et al., "A comparative review of tone-mapping algorithms for high dynamic range video", Computer Graphics Forum, vol. 36, No. 2, May 1, 2017 (May 1, 2017), pp. 565-592, XP055442404, GB ISSN: 0167-7055, DOI: 10.1111/cgf.13148, 28 pages.

International Preliminary Report on Patentability for App. No. PCT/US2019/056741, dated Jun. 8, 2021, 7 pages.

* cited by examiner

COLOR FRINGING PROCESSING INDEPENDENT OF TONE MAPPING

CROSS-REFERENCE TO RELATED APPLICATIONS

This application is a 371 of International Application No. PCT/US2019/056741, filed on Oct. 17, 2019, which claims priority to U.S. Provisional Application No. 62/775,484, filed on Dec. 5, 2018, the entire contents of which are hereby incorporated by reference.

TECHNICAL FIELD

This disclosure relates to color fringing processing.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames from different image sensors may include spatially adjacent or overlapping content, which may be stitched together to form a larger image with a larger field of view. The image stitching process may introduce distortions that depend on the objects appearing within the field of view of the camera and/or the relative positions and orientations of those objects.

SUMMARY

Disclosed herein are implementations of color fringing processing independent of tone mapping.

A first aspect of this disclosure is a method for color fringing processing independent of tone mapping. The method includes receiving an image from an image sensor. Color fringing areas in the image are detected in a linear domain. The detected color fringing areas are corrected to obtain a corrected image. Tone mapping is performed to the corrected image to obtain a tone mapped image. An output image based on at least the tone mapped image is stored, displayed, or transmitted. In an implementation, the correcting is performed in the linear domain. In an implementation, the performing is performed in the non-linear domain. In an implementation, the correcting is performed non-sequentially with respect to the detecting and the method further includes storing positions of the detected color fringing areas. In an implementation, the method further includes accessing the stored positions of the detected color fringing areas. In an implementation, the method further includes setting a color fringing correction indicator. In an implementation, the method further includes determining if the color fringing correction indicator is set. In an implementation, the correcting is performed in the non-linear domain.

A second aspect of this disclosure is a system for color fringing processing independent of tone mapping. The system includes an image sensor configured to capture an image and an image processor configured to receive the image. The image processor including a color fringing detection unit configured to detect color fringing areas in the image, a color fringing correction unit configured to correct detected color fringing areas to obtain a corrected image, and a tone mapping unit configured to tone map the corrected image to obtain a tone mapped image, where the color fringing detection unit is configured to operate prior to the tone mapping unit, and where the image processor is configured to store, display, or transmit an output image based on at least the tone mapped image. In an implementation, the color fringing detection unit is configured to operate in a linear color space. In an implementation, the tone mapping unit is configured to operate in a non-linear color space. In an implementation, the color fringing detection unit is configured to set a color fringing correction indicator when color fringing areas are detected. In an implementation, the color fringing correction unit is configured to operate non-sequentially with respect to the color fringing detection unit and the system further includes a storage unit configured to store positions of the detected color fringing areas. In an implementation, the color fringing correction unit is configured to operate in a linear color space. In an implementation, the color fringing correction unit is configured to operate in a non-linear color space. In an implementation, the color fringing correction unit is configured to access the storage unit when color fringing areas exist. In an implementation, the color fringing correction unit is configured to determine if a color fringing correction indicator is set.

A third aspect of this disclosure is a method for color fringing processing independent of tone mapping. The method includes receiving an image from an image sensor. Color fringing areas in the image are detected in a linear space. The detected color fringing areas are corrected to obtain a corrected image. Tone mapping is performed, in a non-linear space, to the corrected image to obtain a tone mapped image. An output image based on at least the tone mapped image is stored, displayed, or transmitted. In an implementation, the correcting is performed non-sequentially with respect to the detecting and the method further includes storing positions of the detected color fringing areas. In an implementation, the correcting is performed in the non-linear space.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
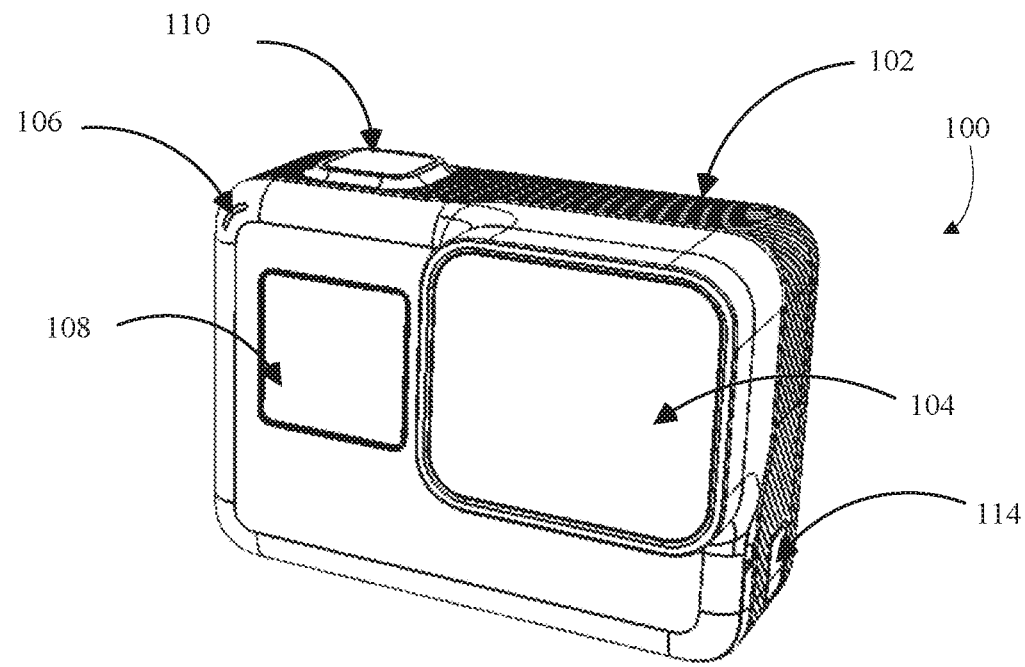
FIGS. 1A-D are isometric views of an example of an image capture device in accordance with embodiments of this disclosure.
Figure 1B:
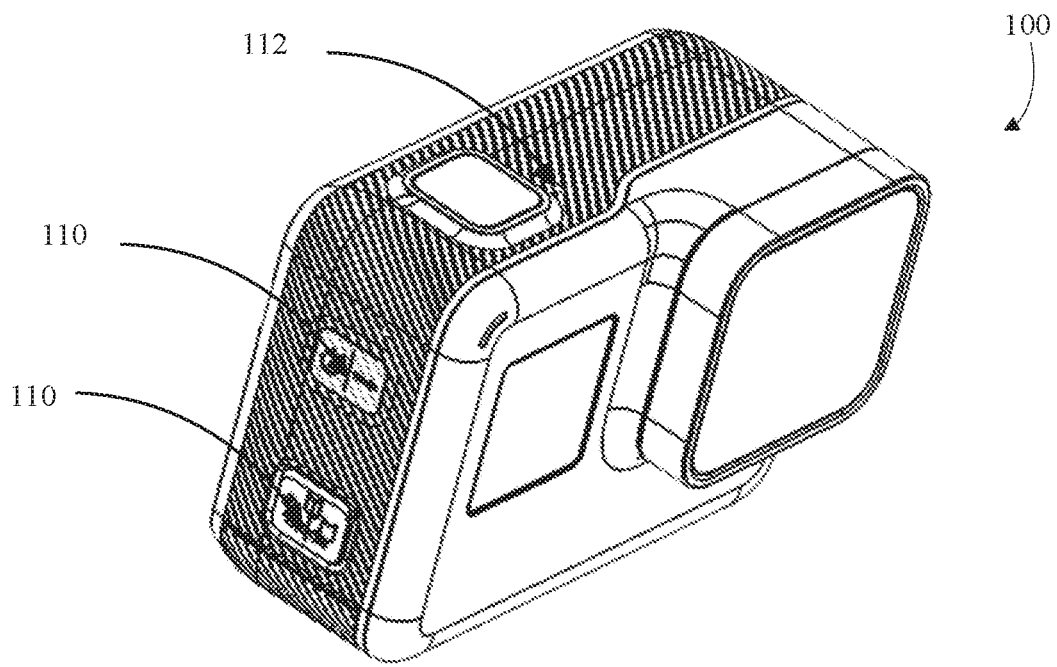
Figure 1C:
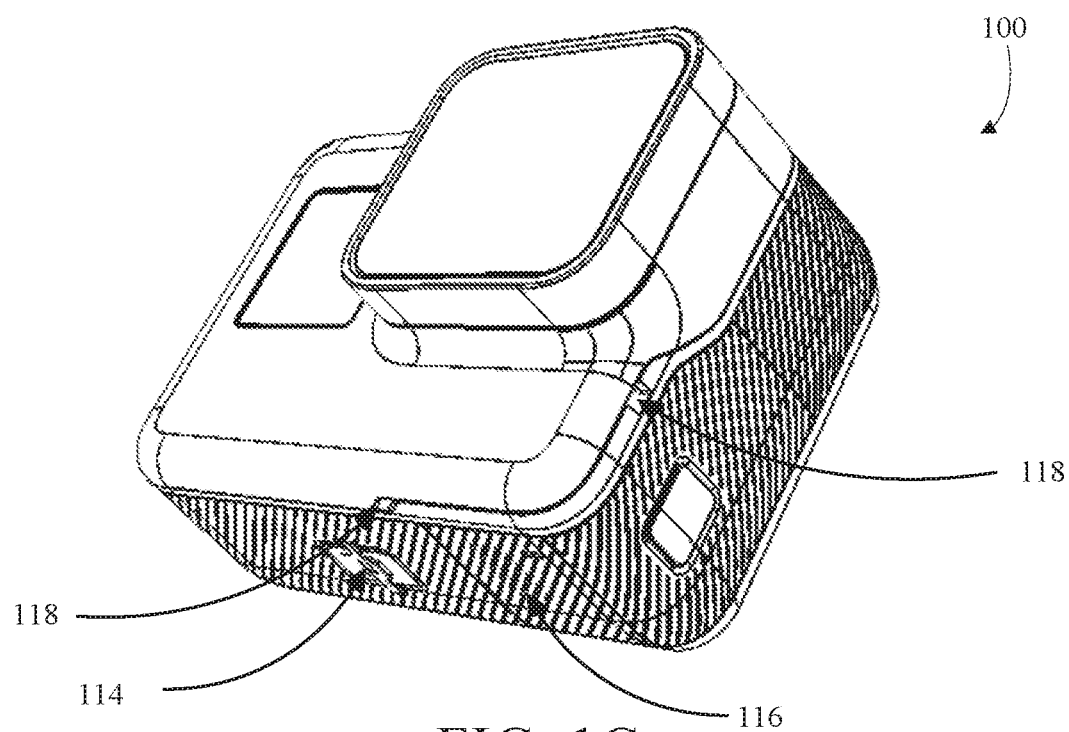
Figure 1D:
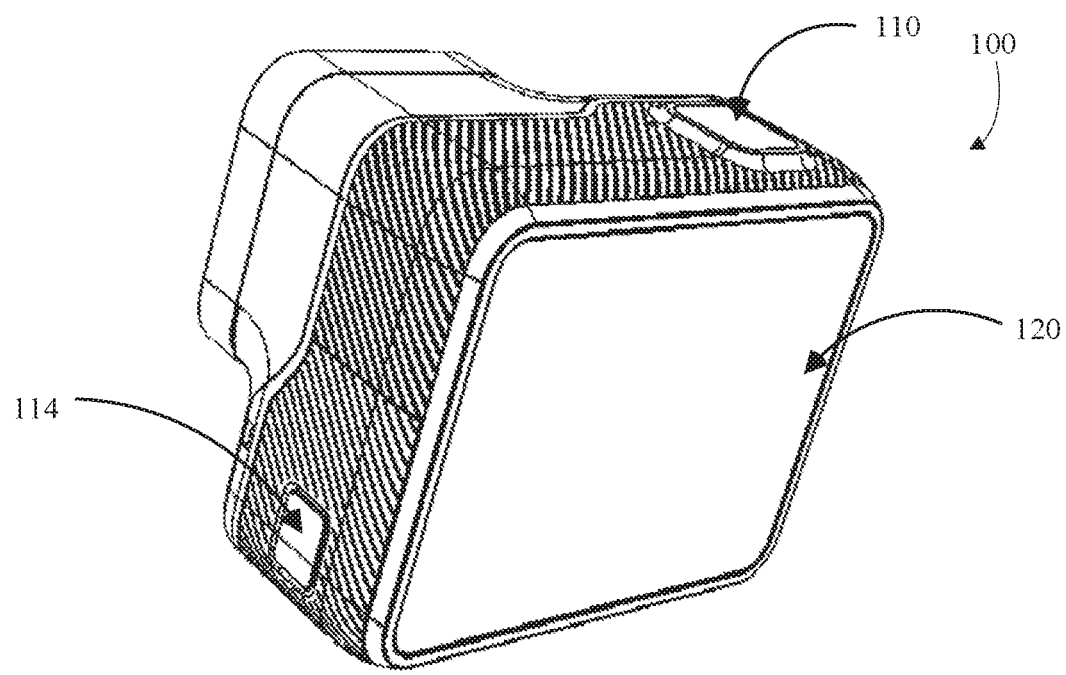

This document includes disclosure of systems, apparatus, and methods for color fringing processing independent of tone mapping to enable enhancement of the quality of images generated by image capture systems. Color fringing may occur due to characteristics of the image sensors or optical components in an image capture device and appear as unfocused purple or magenta ghost images on a captured image (which may also be referred to as purple fringing). Color fringing is more likely to appear near saturated areas on high contrast edges due to blooming, demosaicing, and chromatic aberration, where the former two are characteristics of image sensors and the latter one is a characteristic of optical components such as a lens. For example, color infringing may occur because the lens is unable to aggregate or converge all wavelengths to the same focal plane or the wavelengths are focused at different positions in the focal plane.

Image signal processing techniques may be used to correct the color fringing. These techniques may use the contrast or color gradients between different objects in the captured image to detect the color fringing areas or regions and then perform the color fringing correction. In most instances, color fringing detection and correction techniques are performed on non-linear color space images. This however presents a problem based on how image processing is done in most image processing pipelines. Some image processing techniques may impact the contrast gradients. Tone mapping, for example, is a process of adjusting image luminance to improve contrast in captured images. Application of tone mapping may therefore affect the color fringing correction since contrast gradients may be transformed. In effect, tone mapping may mask color fringing areas. This may be especially true for high dynamic range (HDR) images.

To address the problem of reduced contrast caused by the application of tone mapping, the color fringing detection processing may be performed prior to tone mapping in an image processing pipeline. For example, the color fringing detection processing may be performed on linear color space images. In some implementations, a color fringing mask may be generated by the color fringing detection processing to indicate which areas or regions need color fringing correction. In some implementations, color fringing correction processing may be performed or applied directly after or nearly directly after completion of the color fringing detection processing. For example, color fringing correction processing may be performed on linear color space images. In some implementations, color fringing correction processing may be performed or applied on non-linear color space images. In some implementations, the color fringing mask may be used to indicate which areas or positions the color fringing correction may be applied.

In an implementation, color fringing detection processing and color fringing correction processing may be separated in the image processing pipeline to remove dependencies related to tone mapping. The color fringing detection processing may be implemented in the linear domain. For example, the color fringing detection processing may be performed in the red-green-blue (RGB) color space. The color fringing correction processing may be implemented in the linear domain or in the non-linear domain. For example, the color fringing correction processing may be performed in the luminance and chrominance (YUV) color space.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LED display 108. The image capture device 100 may also include buttons 110 configured to allow a user of the image capture device 100 to interact with the image capture device 100, to turn the image capture device 100 on, and to otherwise configure the operating mode of the image capture device 100. The image capture device 100 may also include a microphone 112 configured to receive and record audio signals in conjunction with recording video. A side of the image capture device 100 may include an I/O interface 114. The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects the internal electronics which are further described in later sections. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. Additional features, such as the features described above, may be affixed to the exterior. In some embodiments, the image capture device 100 described herein includes features other than those described below. For example, instead of a single interface button, the image capture device 100 may include additional buttons or different interface features, such as multiple microphone openings to receive voice or other audio commands.

Although not expressly shown in FIGS. 1A-D, in some implementations, the image capture device 100 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIGS. 1A-D, the image capture device 100 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

The image capture device 100 may interface with or communicate with an external device, such as an external user interface device, via a wired or wireless computing communication link (not shown). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used. In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links. In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100. Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100, such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
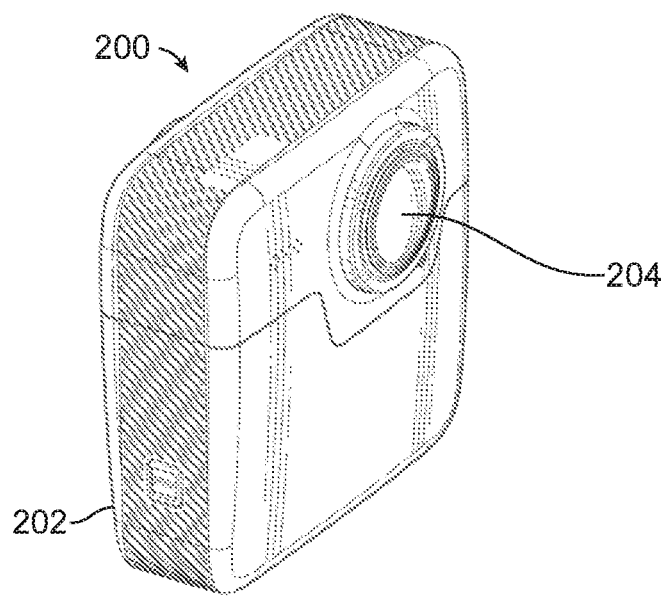
FIGS. 2A-B are isometric views of another example of an image capture device in accordance with embodiments of this disclosure.
Figure 2B:
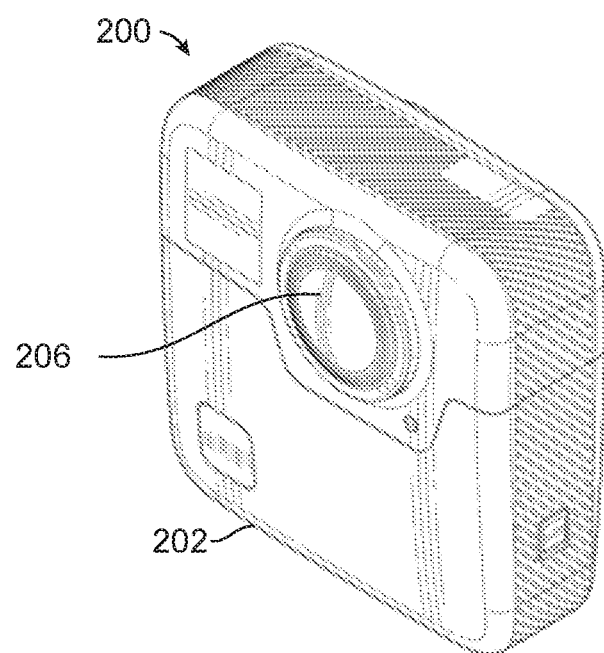

FIGS. 2A-B illustrate an image capture device 200 according to one embodiment. The image capture device 200 comprises a camera body 202 having two camera lenses 204, 206 structured on front and back surfaces of the camera body 202, various indicators on the front and/or back surface of the camera body 202 (such as LEDs, displays, and the like), various input mechanisms (such as buttons, switches, microphones, and touch-screen mechanisms), and electronics (e.g., imaging electronics, power electronics, etc.) internal to the camera body 202 for capturing images via the camera lenses 204, 206 and/or performing other functions. The two lenses 204, 206 are oriented in opposite directions and couple with two images sensors mounted on circuit boards (not shown). Other electrical camera components (e.g., an image processor, camera SoC (system-on-chip), etc.) may also be included on one or more circuit boards within the camera body 202 of the image capture device 200.

Figure 2C:
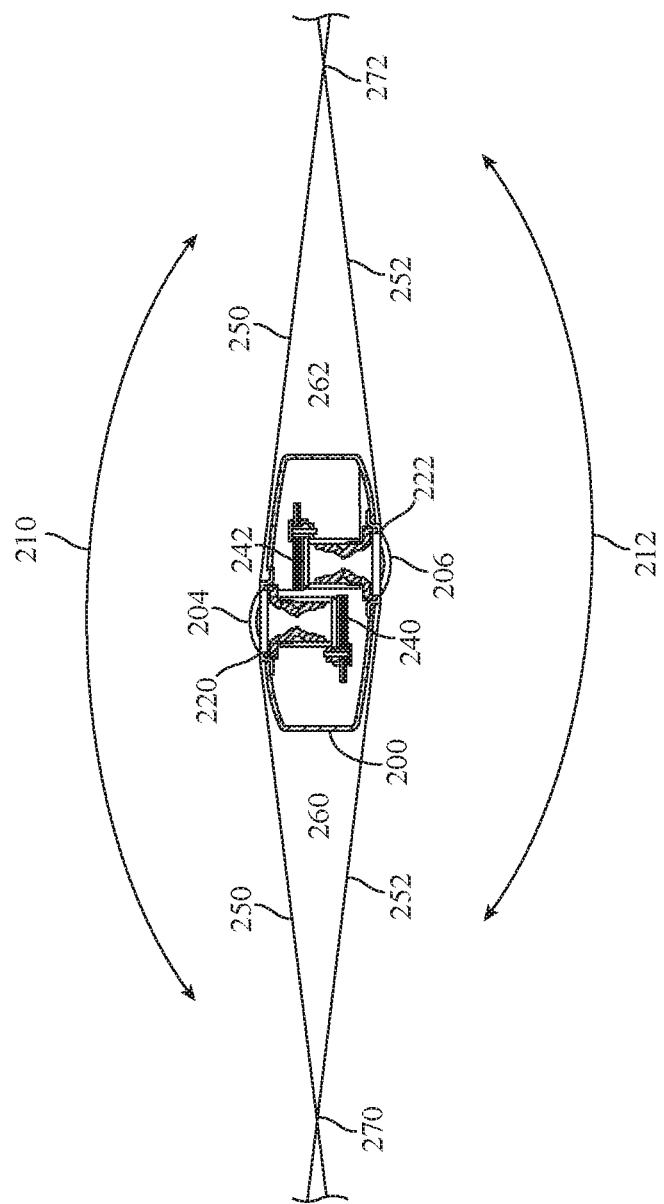
FIG. 2C is a cross-sectional view of the image capture device of FIGS. 2A-B in accordance with embodiments of this disclosure.

FIG. 2C is a cross-sectional view of the image capture device 200 of FIGS. 2A-B. In some implementations, the image capture device 200 may be a spherical image capture device with fields-of-view 210, 212 as shown in FIG. 2C. For example, the image capture device 200 may include image capture devices 220, 222, related components, or a combination thereof, arranged in a back-to-back or Janus configuration. For example, a first image capture device 220 may include the first lens 204 and a first image sensor 240, and a second image capture device 222 may include the second lens 206 and a second image sensor 242 arranged oppositely from the first lens 204 and the first image sensor 240.

The first lens 204 of the image capture device 200 may have the field-of-view 210 shown above a boundary 250. Behind the first lens 204, the first image sensor 240 may capture a first hyper-hemispherical image plane from light entering the first lens 204, corresponding to the first field-of-view 210.

The second lens 206 of the image capture device 200 may have a field-of-view 212 as shown below a boundary 252. Behind the second lens 206, the second image sensor 242 may capture a second hyper-hemispherical image plane from light entering the second lens 206, corresponding to the second field-of-view 212.

One or more areas, such as blind spots 260, 262, may be outside of the fields-of-view 210, 212 of the lenses 204, 206, light may be obscured from the lenses 204, 206 and the corresponding image sensors 240, 242, and content in the blind spots 260, 262 may be omitted from capture. In some implementations, the image capture device 200 may be configured to minimize the blind spots 260, 262.

The fields-of-view 210, 212 may overlap. Stitch points 270, 272, proximal to the image capture device 200, at which the fields-of-view 210, 212 overlap may be referred to herein as overlap points or stitch points. Content captured by the respective lenses 204, 206, distal to the stitch points 270, 272, may overlap.

Images contemporaneously captured by the respective image sensors 240, 242 may be combined to form a combined image. Combining the respective images may include correlating the overlapping regions captured by the respective image sensors 240, 242, aligning the captured fields-of-view 210, 212, and stitching the images together to form a cohesive combined image.

A slight change in the alignment, such as position and/or tilt, of the lenses 204, 206, the image sensors 240, 242, or both, may change the relative positions of their respective fields-of-view 210, 212 and the locations of the stitch points 270, 272. A change in alignment may affect the size of the blind spots 260, 262, which may include changing the size of the blind spots 260, 262 unequally.

Incomplete or inaccurate information indicating the alignment of the image capture devices 220, 222, such as the locations of the stitch points 270, 272, may decrease the accuracy, efficiency, or both of generating a combined image. In some implementations, the image capture device 200 may maintain information indicating the location and orientation of the lenses 204, 206 and the image sensors 240, 242 such that the fields-of-view 210, 212, stitch points 270, 272, or both may be accurately determined, which may improve the accuracy, efficiency, or both of generating a combined image.

Optical axes through the lenses 204, 206 may be substantially antiparallel to each other, such that the respective axes may be within a tolerance such as 1%, 3%, 5%, 10%, and/or other tolerances. In some implementations, the image sensors 240, 242 may be substantially perpendicular to the optical axes through their respective lenses 204, 206, such that the image sensors may be perpendicular to the respective axes to within a tolerance such as 1%, 3%, 5%, 10%, and/or other tolerances.

The lenses 204, 206 may be laterally offset from each other, may be off-center from a central axis of the image capture device 200, or may be laterally offset and off-center from the central axis. As compared to an image capture device with back-to-back lenses, such as lenses aligned along the same axis, the image capture device 200 including laterally offset lenses 204, 206 may include substantially reduced thickness relative to the lengths of the lens barrels securing the lenses 204, 206. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 210, 212.

Images or frames captured by an image capture device, such as the image capture device 100 shown in FIGS. 1A-D or the image capture device 200 shown in FIGS. 2A-C, may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 3B:
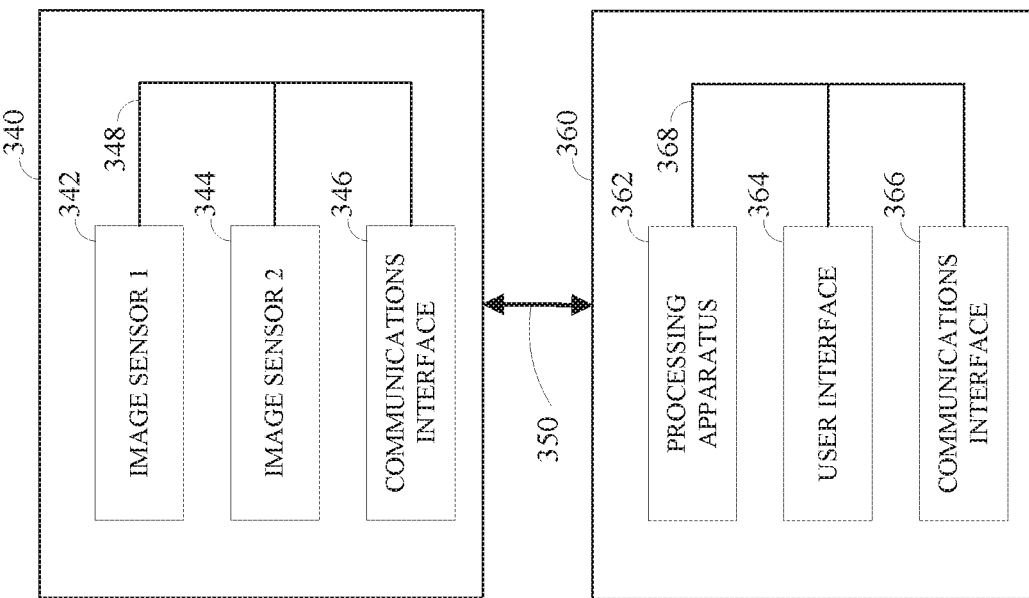
FIGS. 3A-B are block diagrams of examples of image capture systems in accordance with embodiments of this disclosure.
Figure 3A:
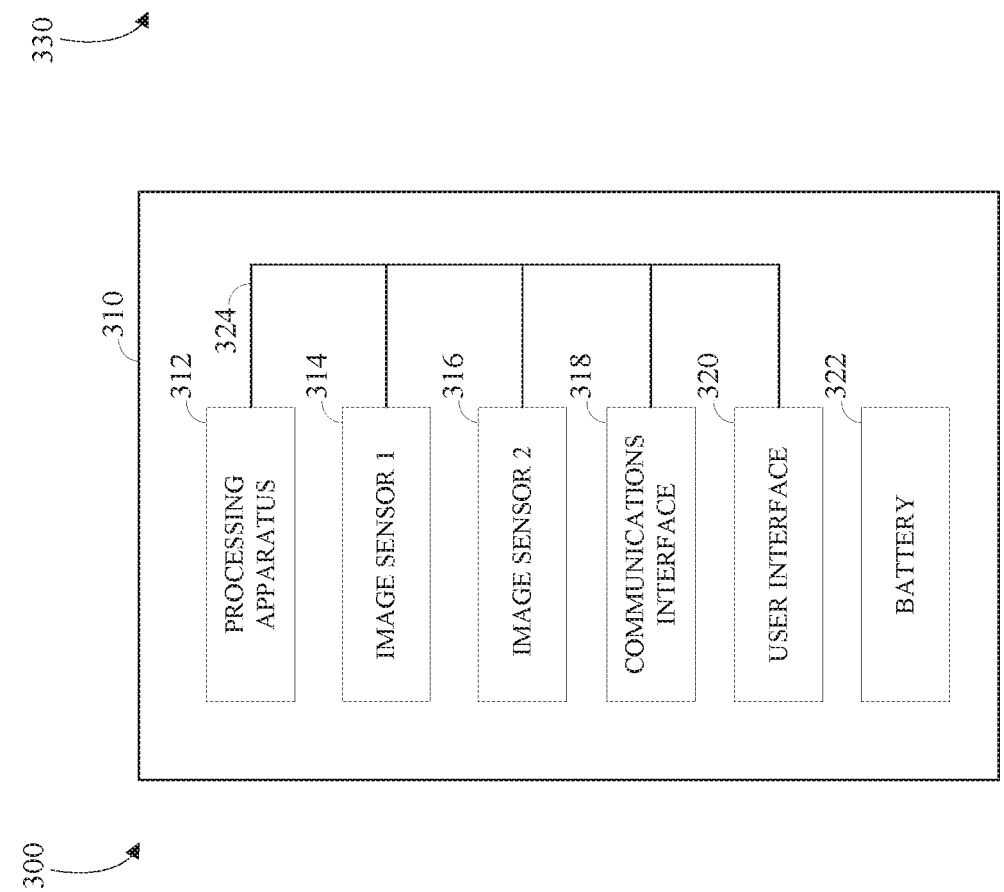

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensors 314 and 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may implement some or all of the techniques described in this disclosure, such as the techniques for color fringing processing described with respect to FIGS. 4-7.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the techniques described in this disclosure, such as the techniques for color fringing processing described with respect to FIGS. 4-7.

Figure 4:
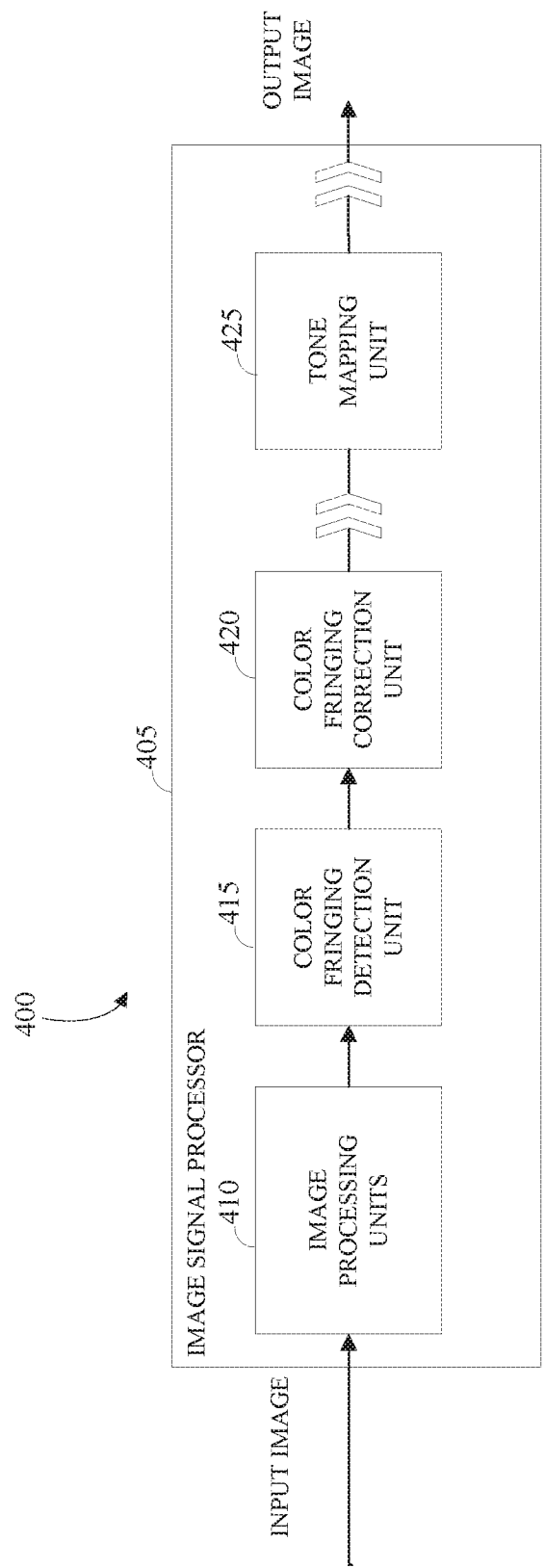
FIG. 4 is a functional block diagram of an example of an image processing pipeline in accordance with embodiments of this disclosure.

FIG. 4 is a block diagram of an example of an image processing pipeline 400 in accordance with implementations of this disclosure. In some implementations, the image processing pipeline 400 may be included in an image capture device, such as the image capture device 100 shown in FIGS. 1A-1D, the image capture device 200 shown in FIGS. 2A-2D or the image capture device 310 shown in FIGS. 3A-3B. In some implementations, the image processing 400 may include an image signal processor (ISP) 405.

The image signal processor 405 may receive an input image signal and output an output image. For example, an image sensor (not shown), such as first image sensor 240 or second image sensor 242 shown in FIG. 2C, may capture an image, or a portion thereof, and may send, or transmit, the captured image, or image portion, to the image signal processor 405 as the input image signal. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 405 may include image processing units 410, which may include spatiotemporal noise reduction (3DNR), dynamic range enhancement, image stitching, scaling, color balancing, clipping and other non-contrast gradient effecting image processing to the input image.

The image signal processor 405 may include a color fringing detection unit 415, which may determine which areas or regions of the input image have color fringing artifacts. The color fringing detection unit 415 may use color or contrast gradient techniques and other known or to be developed techniques to determine color fringing areas.

The image signal processor 405 may include a color fringing correction unit 420, which may apply known or to be developed color fringing correction techniques to the color fringing areas.

In an implementation, the image processing units 410, the color fringing detection unit 415, and the color fringing correction unit 420 may be performed in the linear domain. For example, the image processing units 410, the color fringing detection unit 415, and the color fringing correction unit 420 may apply their respective processing to the input image in a linear color space. The linear color space, for example, may be the RGB color space.

The image signal processor 405 may include additional image signal processing units including a tone mapping unit 425. These additional image signal processing units and the tone mapping unit 425 may be performed in the non-linear domain. That is, the additional image signal processing units and the tone mapping unit 425 may apply their respective processing to the input image in a non-linear color space. The non-linear color space, for example, may be the YUV color space.

Figure 5:
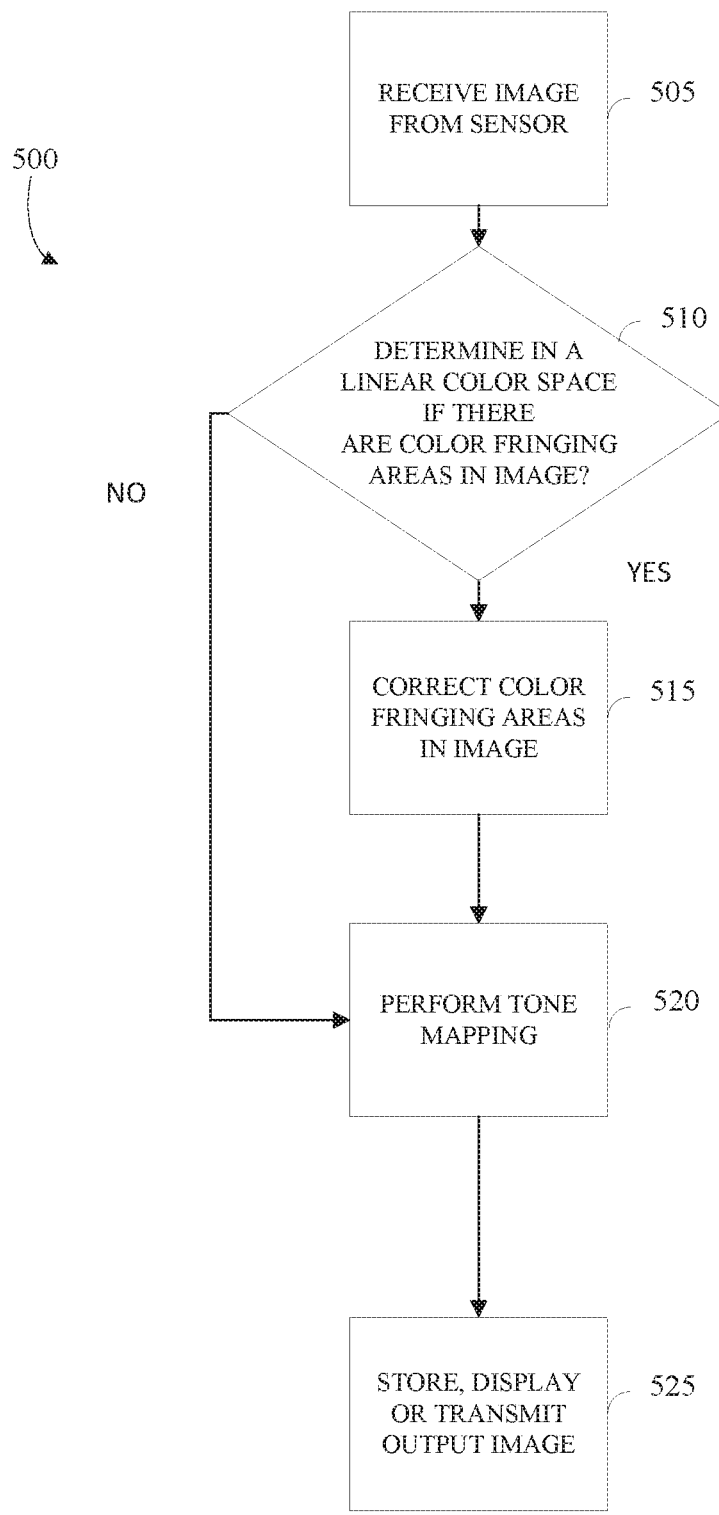
FIG. 5 is a flowchart of an example technique for color fringing detection and correction of a captured image in accordance with embodiments of this disclosure.

FIG. 5 is a flowchart of an example technique 500 for performing color fringing processing independent of tone mapping for an input or captured image. The technique 500 includes: receiving 505 the image from an image sensor; determining or detecting 510 in a linear color space or linear domain if there are color fringing areas in the image; if there are color fringing areas, correcting 515 the color fringing areas; if there are no color fringing areas or color fringing correction is complete, performing 520 tone mapping; and storing, displaying, or transmitting 525 an output image. For example, the technique 500 may be implemented by the image capture device 100 shown in FIGS. 1A-1D, the image capture device 200 shown in FIGS. 2A-2D or the image capture device 310 shown in FIGS. 3A-3B.

The technique 500 includes receiving 505 the image from the image sensor. The image sensor may be part of an image capture apparatus (e.g., the image capture device 100, the image capture device 200, or the image capture device 310). In some implementations, the image sensor may be attached to a processing apparatus that implements the technique 500. For example, the image may be received 505 as an input image signal, which may represent each pixel value in a defined format, such as in a RAW image format. In some implementations, the image may be frame of video, i.e., one of a sequence of images of a video. In some implementations, the image is received 505 directly from the image sensor without intermediate image processing. In some implementations, the image is received 505 after being subjected to intermediate image processing (e.g., correction of dead pixels, band processing, decoupling of vertical blanking, spatial noise reduction, and/or temporal noise reduction).

The technique 500 includes determining 510 in a linear color space or linear domain if there are color fringing areas in the image. The determination of any color fringing areas may be implemented using known or yet to be developed techniques.

Figure 6:
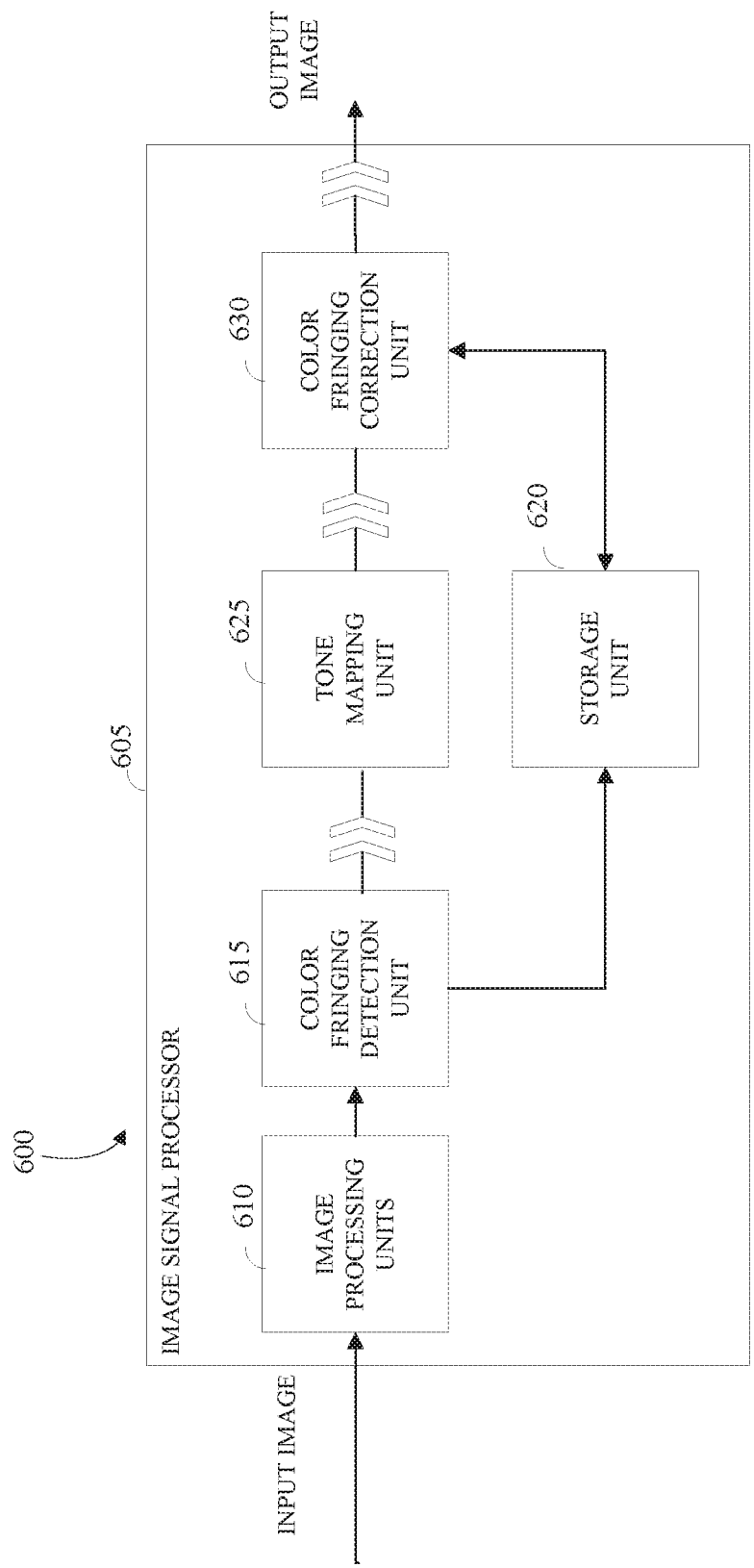
FIG. 6 is a functional block diagram of another example of an image processing pipeline in accordance with embodiments of this disclosure.
Figure 7:
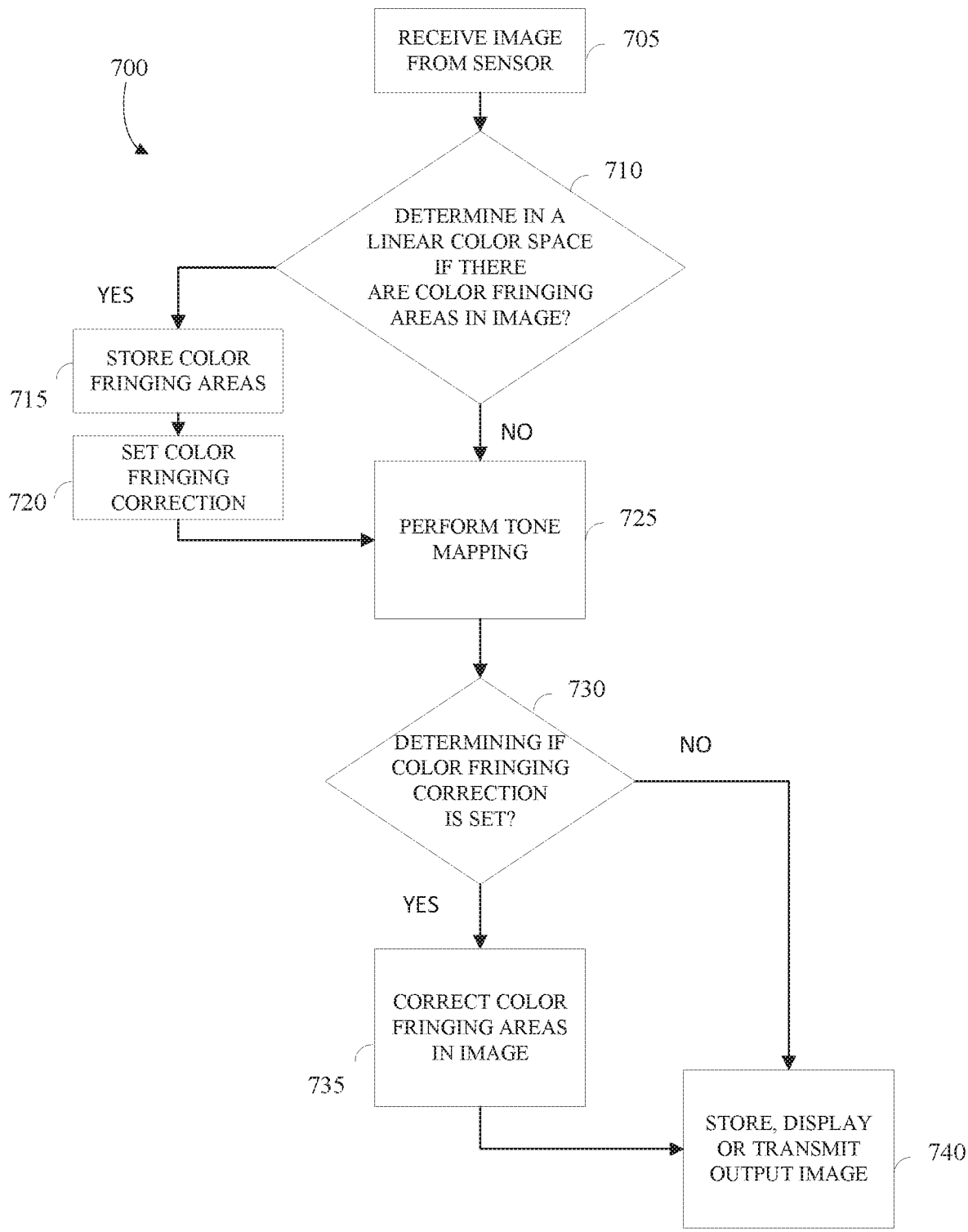
FIG. 7 is a flowchart of another example technique for color fringing detection and correction of a captured image in accordance with embodiments of this disclosure.

The technique 500 includes correcting 515 the color fringing areas when detected. In an implementation, the correcting 515 the color fringing areas may be done directly after the determining 510. In an implementation, the correcting 515 the color fringing areas may be done in a linear color space or linear domain. In an implementation, if or when there is intermediate processing performed between the determining 510 and the correcting 515, the positions of the detected color fringing areas are saved in a storage unit. In an implementation, a color fringing correction indicator is set. In an implementation, a mask corresponding to the color fringing areas is generated and stored. An example is shown in FIGS. 6 and 7. The correcting 515 may be implemented using known or yet to be developed techniques.

The technique 500 includes applying 520 tone mapping after completion of the correcting 515, when appropriate. Other image processing techniques may also be applied. The applying 520 may be performed in a non-linear domain or non-linear color space.

The technique 500 includes storing, displaying, or transmitting 525 an output image.

FIG. 6 is a block diagram of an example of an image processing pipeline 600 in accordance with implementations of this disclosure. In some implementations, the image processing pipeline 600 may be included in an image capture device, such as the image capture device 100 shown in FIGS. 1A-1D, the image capture device 200 shown in FIGS. 2A-2D or the image capture device 310 shown in FIGS. 3A-3B. In some implementations, the image processing 600 may include an image signal processor (ISP) 605.

The image signal processor 605 may receive an input image signal and output an output image. For example, an image sensor (not shown), such as first image sensor 240 or second image sensor 242 shown in FIG. 2C, may capture an image, or a portion thereof, and may send, or transmit, the captured image, or image portion, to the image signal processor 605 as the input image signal. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 605 may include image processing units 610, which may include spatiotemporal noise reduction (3DNR), dynamic range enhancement, image stitching, scaling, color balancing, clipping and other non-contrast gradient effecting image processing to the input image.

The image signal processor 605 may include a color fringing detection unit 615, which may determine, in a linear domain or linear color space, which areas or regions of the input image have color fringing artifacts. The color fringing detection unit 615 may use color or contrast gradient techniques and other known or to be developed techniques to determine color fringing areas.

The image signal processor 605 may include a storage unit 620. The storage unit 620 may be an internal electronic storage unit, shared memory, random-access memory (RAM), flash, or other types of memory. In some implementations, the internal electronic storage unit 414 may include a buffer, or cache, and may buffer the input image signal as an input, or source, image, or frame. In an implementation, the storage unit 605 may store positions of color fringed areas detected by the color fringing detection unit 615. In an implementation, the color fringing detection unit 615 may set a bit as a color fringing indicator, such as a flag. In an implementation, the bit may be stored in a data structure, a table or the like in the storage unit 620. In an implementation, a mask is generated corresponding to the color fringing areas and stored in the storage unit 605.

The image signal processor 605 may include additional image signal processing units including a tone mapping unit 625. These additional image signal processing units and the tone mapping unit 625 may be performed in the non-linear domain. That is, the additional image signal processing units and the tone mapping unit 625 may apply their respective processing to the input image in a non-linear color space. The non-linear color space, for example, may be the YUV color space.

The image signal processor 605 may include a color fringing correction unit 630, which may apply known or to be developed color fringing correction techniques to the color fringing areas. The color fringing correction unit 630 may access the storage unit 620 to determine if color fringing correction is needed and if needed, may access the positions of the color fringing areas. In an implementation, as shown in FIG. 6, the color fringing correction unit 630 may be performed in the non-linear domain. In an implementation, the color fringing correction unit 630 may be performed in the linear domain.

FIG. 7 is a flowchart of an example technique 700 for performing color fringing processing independent of tone mapping for an input or captured image. The technique 700 includes: receiving 705 the image from an image sensor; determining or detecting 710 in a linear color space or linear domain if there are color fringing areas in the image; if there are color fringing areas, storing 715 the color fringing areas; setting 720 a color fringing correction indicator; if there are no color fringing areas or color fringing information is stored, performing 725 tone mapping; determining 730 if color fringing correction is set; if color fringing correction is set, correcting 735 the color fringing areas; and storing, displaying, or transmitting 740 an output image. For example, the technique 700 may be implemented by the image capture device 100 shown in FIGS. 1A-1D, the image capture device 200 shown in FIGS. 2A-2D or the image capture device 310 shown in FIGS. 3A-3B.

The technique 700 includes receiving 705 the image from the image sensor. The image sensor may be part of an image capture apparatus (e.g., the image capture device 100, the image capture device 200, or the image capture device 310). In some implementations, the image sensor may be attached to a processing apparatus that implements the technique 700. For example, the image may be received 705 as an input image signal, which may represent each pixel value in a defined format, such as in a RAW image format. In some implementations, the image may be frame of video, i.e., one of a sequence of images of a video. In some implementations, the image is received 705 directly from the image sensor without intermediate image processing. In some implementations, the image is received 705 after being subjected to intermediate image processing (e.g., correction of dead pixels, band processing, decoupling of vertical blanking, spatial noise reduction, and/or temporal noise reduction).

The technique 700 includes determining 710 in a linear color space or linear domain if there are color fringing areas in the image. The determination of any color fringing areas may be implemented using known or yet to be developed techniques.

The technique 700 includes storing 715 the positions of the detected color fringing areas for later use by the color fringing correction unit 630, for example. In an implementation, a mask is generated corresponding to the color fringing areas and stored.

The technique 700 includes setting 720 a color fringing correction indicator for later use by the color fringing correction unit 630, for example.

The technique 700 includes applying 725 tone mapping after completion of the storing 715 and setting 720, when appropriate. Other image processing techniques may also be applied. The applying 725 may be performed in a non-linear domain or non-linear color space.

The technique 700 includes determining 730 if a color fringing correction indicator is set. For example, the color fringing correction unit 630 may access this information from the storage unit 620.

The technique 700 includes correcting 735 the color fringing areas when appropriate. For example, the color fringing correction unit 630 may access the positions of the color fringing areas from the storage unit 620. In an implementation, the correcting 735 may be performed in a non-linear color space or non-linear domain. The correcting 735 may be implemented using known or yet to be developed techniques.

The technique 700 includes storing, displaying, or transmitting 740 an output image.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving an image from an image sensor;
detecting, in a red-green-blue (RGB) color domain, color fringing areas in the image;
correcting detected color fringing areas to obtain a corrected image;
performing tone mapping to the image to obtain a tone mapped image; and
storing, displaying, or transmitting an output image based on at least the tone mapped image, wherein the performing is done prior to the correcting.

2. The method of claim 1, wherein the correcting is performed in the red-green-blue (RGB) color domain.

3. The method of claim 1, wherein the performing is performed in the non-linear domain.

4. The method of claim 1, wherein the correcting is performed non-sequentially with respect to the detecting, the method further comprising:
storing positions of the detected color fringing areas.

5. The method of claim 4, the method further comprising:
accessing the stored positions of the detected color fringing areas.

6. The method of claim 1, the method further comprising:
setting a color fringing correction indicator.

7. The method of claim 6, the method further comprising:
determining if the color fringing correction indicator is set.

8. The method of claim 1, wherein the correcting is performed in the non-linear domain.

9. A system, comprising:
an image sensor configured to detect an image; and
an image processor configured to receive the image and comprised of:
  a color fringing detection unit configured to detect color fringing areas in the image;
  a color fringing correction unit, operating in a YUV color space, configured to correct detected color fringing areas to obtain an intermediary image; and
  a tone mapping unit configured to tone map the image to obtain a tone mapped image,
wherein the color fringing detection unit is configured to operate prior to the tone mapping unit,
wherein the tone mapping unit is configured to operate prior to the color fringing correction unit, and
wherein the image processor is configured to store, display, or transmit an output image based on at least the tone mapped image.

10. The system of claim 9, wherein the color fringing detection unit is configured to operate in a linear color space and wherein the tone mapping unit is configured to operate in a non-linear color space.

11. The system of claim 9, wherein the color fringing detection unit is configured to set a color fringing correction indicator when color fringing areas are detected.

12. The system of claim 9, wherein the color fringing correction unit is configured to operate non-sequentially with respect to the color fringing detection unit and the system further comprises:
a storage unit configured to store positions of the detected color fringing areas.

13. The system of claim 9, wherein the color fringing detection unit is configured to operate in a red-green-blue color space.

14. The system of claim 9, wherein the tone mapping unit is configured to operate in a non-linear color space.

15. A method comprising:
receiving an image from an image sensor;
detecting, in a red-green-blue domain, color fringing areas in the image;
correcting detected color fringing areas to obtain a corrected image;
performing prior to the correcting, in a non-linear space, tone mapping on a defined image to obtain a tone mapped image; and
storing, displaying, or transmitting an output image based on at least the tone mapped image.

16. The method of claim 15, wherein the correcting is performed non-sequentially with respect to the detecting, the method further comprising:
storing positions of the detected color fringing areas.

17. The method of claim 15, wherein the correcting is performed in the non-linear space.

18. The method of claim 15, wherein the defined image is the image.

19. The method of claim 15, wherein the non-linear space is luminance and chrominance (YUV) color space.

20. The method of claim 15, further comprising:
setting a color fringing correction indicator when color fringing areas are detected; and
determining if the color fringing correction indicator is set.

* * * * *